(12) United States Patent
Edvenson et al.

(10) Patent No.: US 10,922,098 B2
(45) Date of Patent: Feb. 16, 2021

(54) DSP EXECUTION SLICE ARRAY TO PROVIDE OPERANDS TO MULTIPLE LOGIC UNITS

(71) Applicant: MICRON TECHNOLOGY, INC., Boise, ID (US)

(72) Inventors: Gregory Edvenson, Seattle, WA (US); Jeremy Chritz, Seattle, WA (US); David Hulton, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 97 days.

(21) Appl. No.: 15/726,305

(22) Filed: Oct. 5, 2017

(65) Prior Publication Data
US 2019/0108040 A1 Apr. 11, 2019

(51) Int. Cl.
| | |
|---|---|
| *G06F 9/30* | (2018.01) |
| *G06F 15/80* | (2006.01) |
| *G06F 9/448* | (2018.01) |
| *G06F 8/30* | (2018.01) |
| *G06F 9/445* | (2018.01) |

(52) U.S. Cl.
CPC .............. *G06F 9/4496* (2018.02); *G06F 8/31* (2013.01); *G06F 9/30007* (2013.01); *G06F 9/30109* (2013.01); *G06F 9/44505* (2013.01); *G06F 15/80* (2013.01)

(58) Field of Classification Search
CPC ................................ G06F 9/3893; G06F 15/80
See application file for complete search history.

(56) References Cited

U.S. PATENT DOCUMENTS

| | | | | |
|---|---|---|---|---|
| 7,577,820 B1 * | 8/2009 | Wentzlaff | ................ | G06F 15/16 712/10 |
| 8,327,187 B1 | 12/2012 | Metcalf | | |
| 9,043,805 B2 * | 5/2015 | Kwon | ................. | G06F 15/7875 718/108 |
| 9,081,634 B1 * | 7/2015 | Simkins | .................... | G06F 7/57 |
| 9,164,769 B2 * | 10/2015 | Kim | ....................... | G06F 9/3012 |
| 10,114,917 B1 * | 10/2018 | Venkataramani | ..... | G06F 17/505 |

(Continued)

OTHER PUBLICATIONS

U.S. Appl. No. 16/116,869 titled "Forwarded Operand and Machine Learning Utilizing the Same" filed Aug. 29, 2018, pp. all.

(Continued)

*Primary Examiner* — Jacob Petranek
(74) *Attorney, Agent, or Firm* — Dorsey & Whitney LLP (57) ABSTRACT

Apparatuses and methods are disclosed for an FPGA architecture that may improve processing speed and efficiency in processing less complex operands. Some applications may utilize operands that are less complex, such as operands that are 1, 2, or 4 bits, for example. In some examples, the DSP architecture may skip or avoid processing all received operands or may process a common operand more frequently than other operands. An example apparatus may include a first configurable logic unit configured to receive a first operand and a second operand; a second configurable logic unit configured to receive a third operand and the first calculated operand; a first switch configured to receive the first operand and a fourth operand and to output a first selected operand; and a second switch configured to receive the second calculated operand and the first selected operand.

22 Claims, 6 Drawing Sheets

(56) References Cited

U.S. PATENT DOCUMENTS

| | | |
|---|---|---|
| 2005/0144215 A1 | 6/2005 | Simkins et al. |
| 2005/0144216 A1* | 6/2005 | Simkins .................. G06F 7/509 |
| | | 708/620 |
| 2010/0192118 A1* | 7/2010 | Wendling ................ G06F 7/575 |
| | | 716/117 |
| 2016/0085721 A1 | 3/2016 | Abali et al. |
| 2019/0108018 A1 | 4/2019 | Edvenson et al. |
| 2019/0108019 A1 | 4/2019 | Edvenson et al. |
| 2019/0108042 A1 | 4/2019 | Edvenson et al. |

OTHER PUBLICATIONS

U.S. Appl. No. 16/117,529, titled "Configurable Digital Signal Processor Fracturing and Machine Learning Utilizing the Same", filed Aug. 30, 2018, pp. all.

Ultrascale Architecture DSP Slice User Guide, UG579 (v.1.3), Nov. 24, 2015, p. 1-74, Nov. 24, 2015.

Ultrascale Architecture DSP Slice User Guide, UG579 (v1,4), Jun. 1, 2017, p. 1-74, Jun. 1, 2017.

U.S. Appl. No. 15/726,293, entitled "Forwarded Operand and Machine Learning Utilizing the Same", filed Oct. 5, 2017, pp. all.

\* cited by examiner

DSP EXECUTION SLICE ARRAY TO PROVIDE OPERANDS TO MULTIPLE LOGIC UNITS

BACKGROUND

Many processing architectures exist to accomplish digital signal processing (DSP) capabilities, such as adders, multipliers, and other arithmetic logic units (ALUs) utilized in combination. For example, digital signal processing for wireless communications, such as digital baseband processing or digital front-end implementations, may be implemented using hardware (e.g. silicon) computing platforms. Multimedia processing and digital radio frequency (RF) processing may be implemented using an application-specific integrated circuit (ASIC). Accordingly, a variety of hardware platforms are available to implement digital signal processing, such as the ASIC, a digital signal processor (DSP) implemented as part of a field-programmable gate array (FPGA), or a system-on-chip (SoC). However, each of these solutions often requires implementing customized signal processing methods that are hardware-implementation specific. Such architectures, custom-built, may not be able to (or not efficiently able to) implement other applications that were not designed specifically for that hardware architecture

BRIEF DESCRIPTION OF THE DRAWINGS

FIGS. 2A-3 are block diagrams of example apparatuses in accordance with various examples of the present disclosure.

DETAILED DESCRIPTION

Example systems and methods described herein include digital signal processors (DSPs) that can fracture configurable logic blocks of an FPGA, for example, fracturing a configurable logic block implementing a DSP slice. Fracturing a DSP slice, to process a common operand, may allow an integrated circuit to perform machine learning or artificial intelligence operations more efficiently. For example, a DSP slice may be utilized to forward a common operand to another ALU in the same or another DSP slice for computation in a machine learning algorithm, when a switch is activated that selects the common operand, thereby fracturing the DSP slice to process a common operand.

In some current implementations of DSP slices in an FPGA architecture, a DSP slice may receive operands and process such operands. For example, the DSP may process the operand by utilizing the operand in a digital signal processing operation or any operand computation utilized in a method or process that the DSP slice implements. DSP slices may process complex operands, such as 8 or 16 bit operands, with other complex operands in a single DSP slice. However, machine learning applications (e.g., a machine learning algorithm) may or may not employ complex operands. Some machine learning applications may optimize processing speed and efficiency over the complexity and precision that complex operands may provide to other applications. For example, some machine learning applications may utilize operands that are less complex, such as operands that are 1, 2, or 4 bits. Accordingly, it may be advantageous to provide a DSP architecture that does not process all received operands or process a common operand more frequently than other operands. In some examples, the DSP architecture may skip or avoid processing all received operands or may process a common operand more frequently than other operands In example systems and methods described herein, rather than retrieving an operand from a cache and sending the same operand to each configurable logic unit (e.g., ALU) of a DSP slice, an DSP slice may forward a common operand from one configurable logic unit of that DSP slice to another configurable logic unit of that DSP slice. For example, the DSP slice can be segmented or fractured with a switch configured to select between inputs: one input may be the operand received from memory, while the other input may be a shared input line with another configurable logic unit of that DSP slice. A switch may receive a selection signal that indicates when a common operand is to be processed. Based on the selection signal, the switch may select the input with a shared configurable logic unit line, to forward an operand received as an input to another DSP slice. Advantageously, in selecting the input with a shared configurable logic unit line, the switch may provide that common operand, without an operation having been performed on that operand by the configurable logic unit to which the common operand had initially been sent.

Some machine learning applications involve processing of the same operand multiple times in a single DSP time flop. For example, a machine learning application may utilize an algorithm with a decision tree. A decision tree may be utilized in a variety of machine learning applications, such as to learn a wireless communications parameter, a data analytics parameter, a processing parameter for a hardware device unit, or a financial transaction parameter. A decision tree can include a variety of paths that change based on a preceding branch of the tree.

Each node in a decision tree may represent a different computation that stems from a common operand of that node. For example, a common operand combined with a variety of other operands may create respective branches that stem from a node at a certain level in the tree. The node of the tree may be the common operand, with each branch representative of a processing result (e.g., an intermediate or final processing result), when that common operand is combined with another operand. In some applications, to determine the most efficient path in a decision tree, a computation of each branch may be used in ascertaining the most efficient path, for example, as defined by an optimization problem that the decision tree may be solving. For example, a sum, weighted combination, or any mathematical combination of branches in the tree may be representative of a path, with the most efficient path through the tree passing a threshold or passing the other computation results of logically similar paths. For example, a similar path may be a path that starts at an initial node and ends at a final node, with paths defined by different branches to traverse from the initial node to the final node.

In some machine learning applications, a problem to be solved may be an optimization problem, which may be a least squares solution to a set of training data that includes input and outputs for training a machine learning model. Other optimizations are possible, such as a convex optimization when training data may be modeled as a convex set. In examples of systems described herein, rather than retrieving from an operand from a cache and sending that same operand to each DSP slice of an FPGA, an existing DSP slice may forward a common operand to another DSP slice; or an existing FPGA architecture may forward the common operand along a column of a plurality of DSP slices. Accordingly, examples of systems and methods described herein may allow for more efficient processing in machine learning applications, such as solving an optimization problem with a decision tree.

A common operand in a machine learning application may be provided to logically similar DSP slices of an FPGA to process more efficiently that common operand. Accordingly, in the example of a common operand being a node of a tree, each branch of that tree may be computed substantially in parallel at a plurality of DSP slices, for example. Without the use of a common operand provided to logically similar DSP slices, a DSP slice may sequentially compute each branch of that tree, with the common operand being retrieved multiple times in succession from an operand register.

Figure 1:
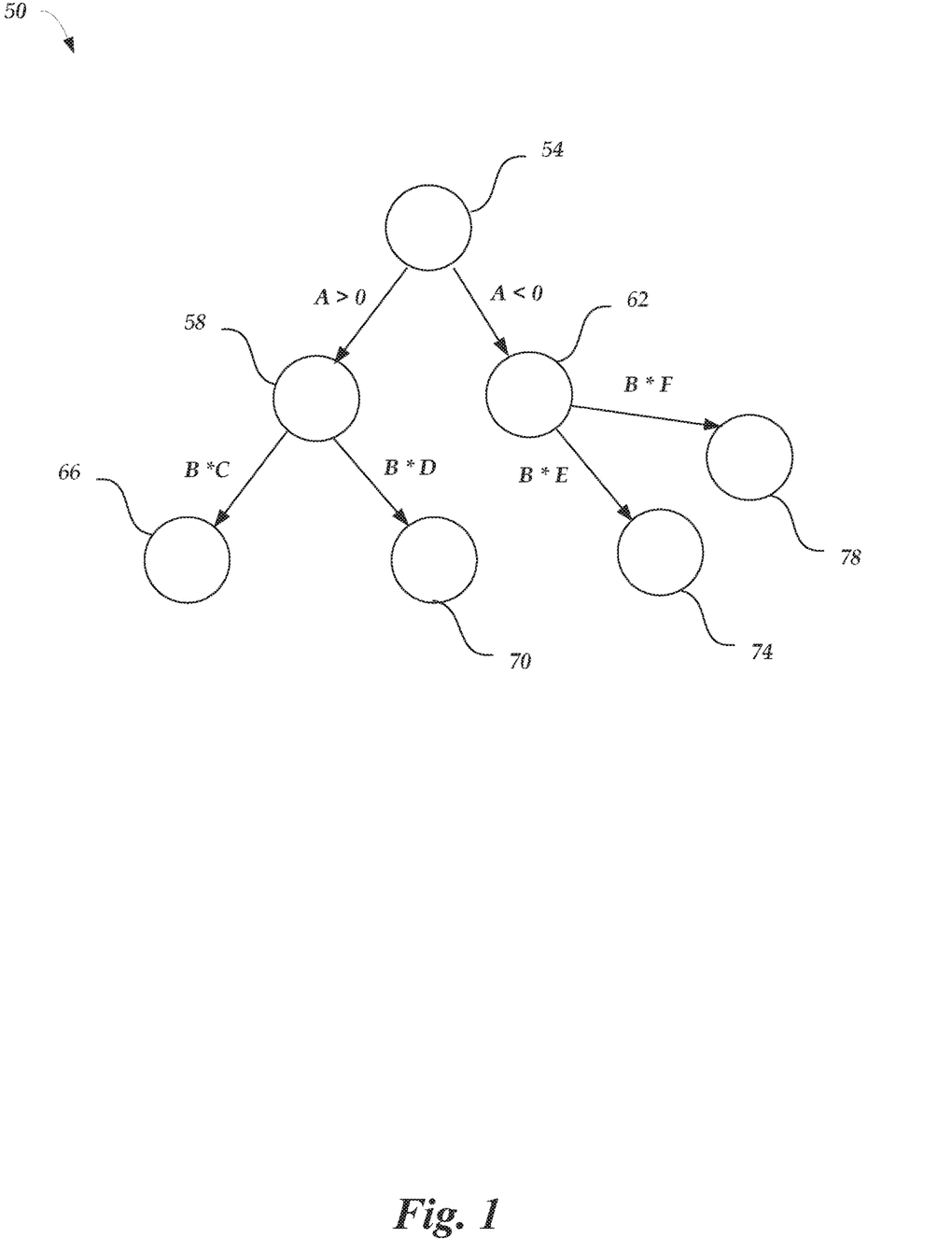
FIG. 1 is a block diagram of an example decision tree.

As an example of a common operand being forwarded in a machine learning application, a decision tree implementation of a machine learning application may utilize such forwarding of a common operand, which may be referred to as performing one or more learning operations. FIG. 1 is a block diagram of an example decision tree 50. A decision tree may be utilized in machine learning operations to determine a parameter. For example, the decision tree 50 may be utilized to determine a likelihood of an event occurring, e.g., a cell phone call dropping. At tree node 54 of decision tree 50, a comparison operation may be executed regarding an operand A. For example, operand A may represent a probability of a cell phone being in a certain region. The compare operation may compare operand A to 0. Accordingly, a probability of the cell phone being in the certain region could be represented by a positive or negative integer corresponding to the probability, such that the 0 of the comparison is equivalent to a 50% probability. Accordingly, if the cell phone has such a probability, the decision tree 50 operates to a guide an operation according to another determination regarding another parameter of the likelihood of an event occurring. In the example, if the cell phone is in a certain region, decision flow proceeds to tree node 58 from tree node 54. If the cell phone is not in the certain region, decision flow proceeds to tree node 62 from tree node 54. Both such compare operations may be executed in an FPGA in one or more DSP slices. In such a case, the operand A may be forwarded to another DSP slice, such that both compare operations leading to tree nodes 58, 62 may occur in the same processing thread.

Continuing in the example of FIG. 1, a next operation may multiply the probability of the cell phone being in the region or not by the probability of that cell phone being connected to a particular base station and/or device. The operands C, D, E, and F may represent probabilities of various base stations and/or devices being connected to the example cell phone, with its probability of being connected being represented as operand B. Such multiply operations may be executed in an FPGA in one or more DSP slices. In such a case, the operand B may be forwarded to one or more DSP slices, such that both multiply operations leading to leaf nodes 66, 70, 74, and 78 may occur in the same processing thread. Accordingly, the branches of tree nodes 58, 62 may lead to leafs 66, 70, 74, and 78 that correspond to a likelihood of a cell phone call dropping for a cell phone connected to one of the base stations and/or devices represented by the operands C, D, E, and F, respectively, whether in the region or not. While described in the context of a cell phone call dropping, the decision tree 50 may guide various operations with varying likelihoods for various devices.

As another example of a decision tree 54 being utilized in a learning operation, a learning operation may determine the most efficient path from an initial node to a final node, having used common operands to define each intermediate node between the initial node and the final node, with the branches of nodes representative of computations at each node that combine the common operand with another operand. An efficient path in the decision tree 50 may be a path of the tree 50 from the tree node 54 to a leaf 66, 70, 74, and 78 with the lowest likelihood of the cell phone call dropping. Learning operations may be performed, for example, to ascertain parameters in various fields such as wireless communications or financial transactions. In each case, a learning operation may determine a parameter based on an efficient path of a decision tree that evaluates varying scenarios utilizing that parameter. For example, the parameter may be an initial node of the decision tree or a final node of the decision tree, and paths may be constructed that determine an efficient outcome for an operation that utilizes that parameter (e.g., as an initial tree node) or ends with that parameter (e.g., as a final leaf node).

Figure 2A:
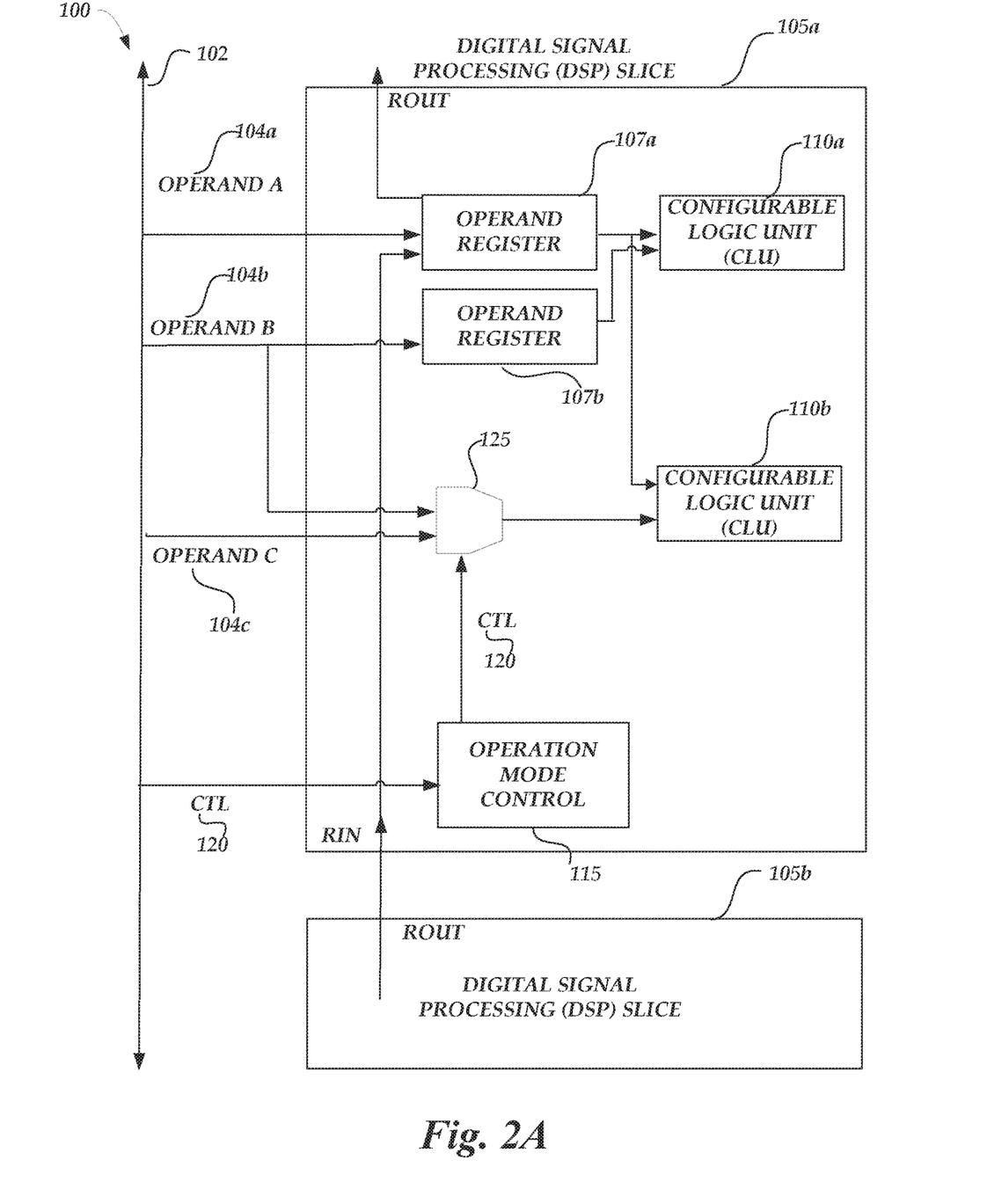

FIG. 2A is a block diagram of an apparatus 100 in accordance with various examples of the present disclosure. The apparatus 100 includes an interconnect 102 and DSP slices 105a-105b coupled thereto. The DSP slices 105a b may be logical circuits that may be coupled or cascaded to form different DSP circuits. For example, several DSP slices 105a b may be cascaded to form a 256 point Fast Fourier Transform (FFT) circuit that processes certain time domain inputs to generate a frequency domain output. DSP slices 105a b may be cascaded or coupled to other DSP slices to form other DSP circuits that perform DSP operations. While only two DSP slices 105a, 105b are depicted in FIG. 1, it can be appreciated that apparatus 100 may include any number of DSP slices, for example, as described with reference to FIG. 3. Each DSP slice 105a-105b may include configurable logic units (e.g., an arithmetic logic unit) that implement a portion or all of DSP operations performed by the apparatus 100. For example, DSP slice 105a may perform a first portion of a DSP operation including operand multiplication and DSP slice 105b may perform a second portion of that DSP operation including operand addition. The apparatus 100 may be implemented in various hardware platforms, including but not limited to: an ASIC, a DSP implemented in an FPGA, or a SoC.

The apparatus 100 may be configured with a cascade of DSP slices in which DSP slices are connected together such that a DSP slice may provide at least one output path as at least one input path to another DSP slice. In cascading multiple DSP slices together, the DSP slices may work in conjunction to implement a portion or all of a DSP operation performed by the apparatus 100. Accordingly, multiple DSP slices may be cascaded together to perform various types of DSP operations, such as filtering, equalization, transformations, matrix computations, etc. As depicted in FIG. 1, the DSP slice 105b includes an output path ROUT that is coupled to the DSP slice 105a as the input path RIN to the DSP slice 105a. Such an output path ROUT may provide operands processed or received by the DSP slice 105b to the DSP slice 105a. In some embodiments, while not shown in FIG. 1, the output path ROUT and/or the input path RIN may be coupled to the interconnect 102, such that the inputs and/or outputs of some of the DSP slices may be coupled via the interconnect 102, rather than direct connections between individual DSP slices, such as depicted in the cascaded coupling of DSP slice 105a to the DSP slice 105b. The output path ROUT may be an output of the DSP slice 105a In some examples, the output path ROUT may be in an input path to another DSP slice 105b, via the interconnect 102.

Figure 2B:
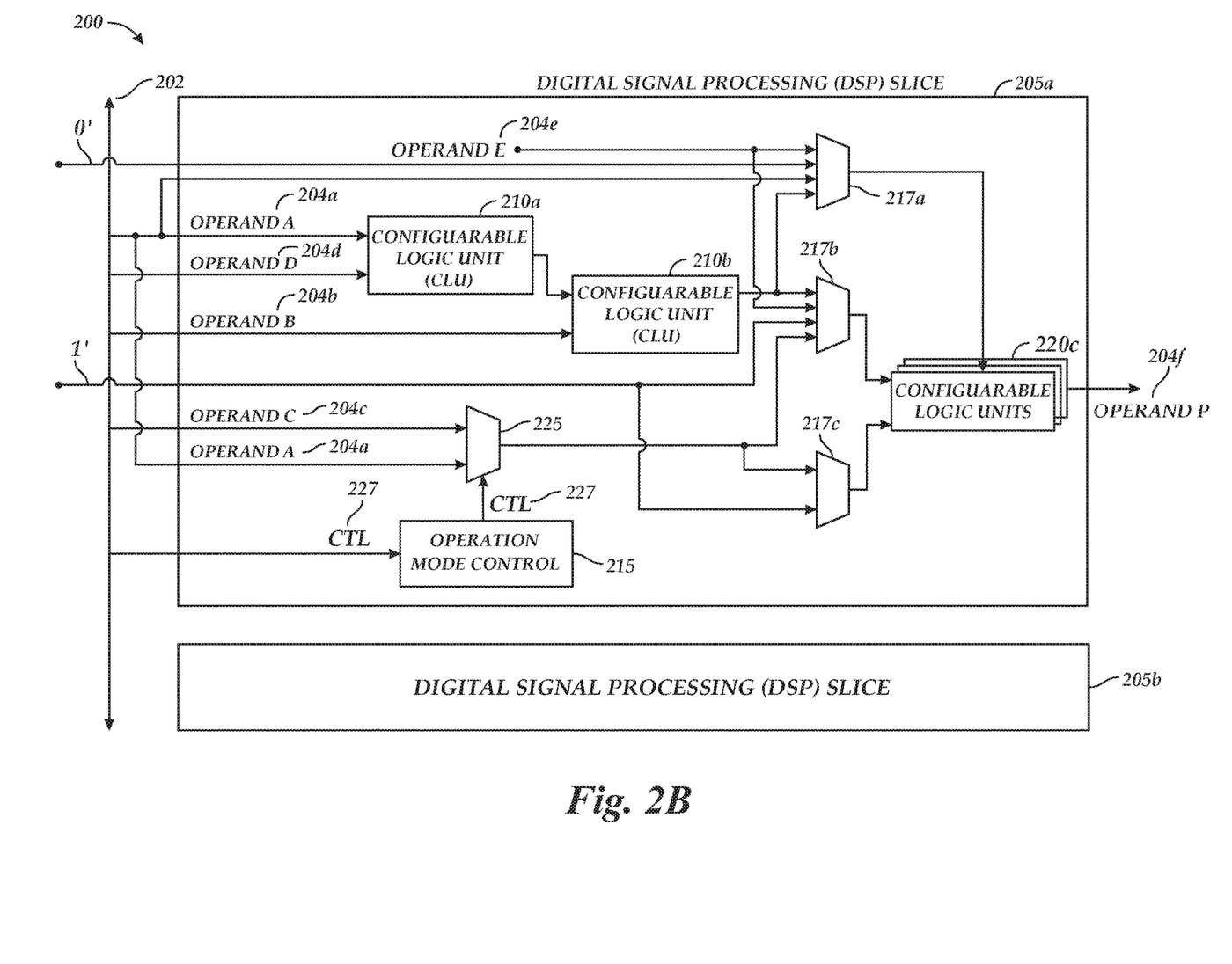

In various embodiments, operands may be various bit lengths, such as 2, 4, 8, 16, 18, 32 (e.g., single precision), or 64 (e.g., double precision) bits, for example. Operands may represent floating point numbers that include an exponent and mantissa. Operands may also represent complex numbers, such as in a Q15.1 representation, corresponding to 15 bits and 1 signed bit, in a 16 bit complex operand, for example. In various examples, the apparatus 100 or 200 may be utilized in a second mode that forwards operands with bits less than 64 bits are utilized.

In some examples, a common operand that represents a complex number (e.g., Q15.1 representation) may be utilized in wireless communications operations. For example, a 16 bit operand representing a complex number may correspond to real and imaginary parts of a wireless communications signal. A common operand may also represent a floating point number with various bit lengths. Such floating point operands may be utilized in machine learning applications, for example, for the training of a non-linear model. In an example, a floating point operand of 16 bits may represent 16 weights, and each weight may be applied to various vectors represented by other operands. In the context of FIG. 1, any of the operands C, D, E, or F may correspond to vector that is multiplied by the operand B. In other cases, a machine learning application may utilize floating point operands that are 8, 4, 2, or 1 bits. In another example, such floating point operands may be utilized in accumulate operations as implemented by an XOR gate.

As described herein, a DSP slice may be operated in one of several modes. For instance, in a first mode, which may be referred to as a in a second mode, the DSP slice 105a may include a switch 125 that is configured to select a common operand (e.g., operand B 104b) received directly from an input path of a configurable logic unit of the DSP slice 105a that is coupled to the interconnect 102. This may be in contrast to a DSP slice operating in a second mode, which may be referred to as a first mode, as described below. Accordingly, in the first mode, that common operand may be utilized in a DSP operation performed by the DSP slice 105a, having received the common operand at the configurable logic unit 110a via the operand register 107b and the configurable logic unit 110b via the switch 125. In forwarding such a common operand in the DSP slice, the apparatus 100 may operate more efficiently for certain DSP processing operations that include a common operand because several operations regarding the common operand may be performed in a less processing threads than conventionally processed in multiple processing threads, for example, during the second mode. The apparatus 100 may process the common operand at both the configurable logic unit 110a and the configurable logic unit 110b during substantially the same time period. For example, the DSP slices 105a and 105b may process the common operand in several DSP operations during a single processing thread of the apparatus 100. In some examples, the DSP slices 105a and 105b may process the common operand in several DSP operations, but in less processing threads than a conventional FPGA, such as a XILINX® FPGA.

DSP slices 105a, 105b can include various types of DSP elements, including but not limited to: operand registers, CLUs, and an operation mode control in the same manner as DSP slice 105a. DSP slice 105b may also include such elements in a different arrangement or with additional or less elements, provided that DSP slice 105b still has a register output ROUT, for example as depicted in FIG. 1. DSP slice 105b may represent a DSP slice in the apparatus 100 that is cascaded in a column like fashion to the DSP slice 105a. Other embodiments are possible, for example, the DSP slice 105b may be cascaded to an output of a CLU 110 of the DSP slice 105a, with a feedback path of the output of the CLU 110 to the interconnect 102 also being coupled to the output path ROUT of the DSP slice 105a, such that operands received from the interconnect 102 may be forwarded to that cascaded DSP slice 105b.

The DSP slice 105a includes operand registers 107a, 107b, configurable logic units (CLUs) 110a, 110b, operation mode control 115, and a switch 125. The operand registers 107a, 107b may each include an input port for an input path coupled to the interconnect 102. The operand registers 107a, 107b may also include input and output data paths to one or more CLUs, such as CLUs 110a, 110b. Each of the operand registers 107a, 107b may store an operand in its register such that a CLU 110a, 110b may request that operand for a calculation and/or computation. As depicted, the operand registers 107a, 107b may receive and store the operand A 104a and operand B 104b, respectively. The operand registers 107a, 107b may also receive and store calculated operands from the CLUs 110a, 110b. For example, either of the operand registers 107a, 105b may have a stored operand that was calculated by a configurable logic unit 110a or configurable logic unit 110b, and stored therein. Either of the operand registers 107a, 107b may latch such a calculated operand. A stored, calculated operand of the operand register 107a may be provided to the output path ROUT of the DSP slice 105a for further calculation as part of a cascaded DSP operation that may continue calculations at another DSP slice of the apparatus 100

A configurable logic unit 110 may perform a variety of arithmetic or DSP operations. A CLU 110 may be an arrangement of circuit elements or a single circuit that performs such an operation. For example, such circuit elements may include a various logical units, such as AND, OR, NOT, NAND, NOR, XOR, or XNOR gates. A CLU 110 may be used to implement an adder unit, a multiplier unit, an accumulator unit, a multiply accumulate unit, a carry in unit, a carry out unit, a bit shifter, a logic unit configured with NAND gates, and/or generally any type of arithmetic logic unit or DSP logic unit that may process DSP operations. CLUs 110 may include input ports for input paths coupled to the interconnect 102. Each of the CLUs 110 or one or more of the CLUs 110 working in combination may receive and process operands via a corresponding input path to that CLU 110 or the one or more of the CLUs 110 working in combination. For example, the CLU 110a may receive the operand B 104b to process that operand in a CLU configured as an adder that adds a stored operand from the operand register 107, such as operand A 104a. The CLU 110b may receive the operand C 104c to process that operand in a CLU configured as a multiplier that multiplies a stored operand from the operand register 107, such as operand A 104a.

The operation mode control 115 of the DSP slice 105a may receive a control signal CTL 120 that indicates an operation mode for that DSP slice 105a, such as a first mode or a second mode. The operation mode control 115 may be implemented using a mode register that stores a mode indicator based on the control signal CTL 120 indicating a mode for the DSP slice 105a. The mode of the DSP slice 105a may control the switch 125 to select a common operand (e.g., operand B 104b) received from an input path of a configurable logic unit of the DSP slice 105a that is coupled to the interconnect 102. In a first mode, the switch 125 may be activated to select the received operand C 104c from an input path coupled to the interconnect 102; while, in a second mode, the switch 125 may be activated to select a common operand (e.g., operand B 104b) received from another input path coupled to the interconnect 102. Accordingly, in a first mode, the switch 125 may select the operand C 104c for communication to the configurable logic unit 110b. In some embodiments, the switch 115 is by default activated in the first mode, which provides the operand C 104c to the configurable logic unit 110b.

As mentioned above, in a second mode, the switch 125 may select the operand B 104b for communication to the configurable logic unit 110b. With the embodiment of apparatus 100, a common operand may be provided to more than one configurable logic unit 110a, 110b or operand register 107a, 107b. In contrast to the first mode that may utilize each input path of the DSP slice 105a to provide an operand to either an operand register 107a, 107b or the configurable logic unit 110b, the DSP slice 105a may be fractured, in the second mode, such that at least one input path shares an operand (e.g., once shared, a common operand) with another input path of the DSP slice 105a. In the embodiment depicted of apparatus 100, the operand B 104b is provided to the configurable logic unit 110b via the switch 125 when the apparatus 100 has been fractured, such that the input path to the operand register 107b is shared with an input path to the switch 125. In selecting a common operand during the second mode, the DSP slice 105a may forward the common operand to various configurable logic units of the DSP slice 105a for processing of that common operand. Having provided forwarded operands to additional configurable logic units of the DSP slice 105a, multiple computations with the same operand, now a common operand to other configurable logic units, may be computed for algorithms that may utilize a common operand, thereby advantageously improving processing speed of such algorithms in some examples.

In an example of a machine learning algorithm, a decision tree computation may be implemented in the apparatus 100; for example, such as to learn a wireless communications parameter, a data analytics parameter, a processing parameter for a hardware device unit, or a financial transaction parameter. The interconnect 102 may provide common operands to multiple FPGAs 100, such that each apparatus 100 receives a common operand that may represent a node in the implemented decision tree. For example, a common operand, operand B 104b may be combined with a variety of other operands in the apparatus 100. The processing results (e.g., an intermediate or final processing result) of those combinations may represent respective branches in the implemented decision tree, with the common operand 104b being the common node. In the example, the operand B 104b is provided to both configurable logic unit 110a, via the operand register 107b, and the configurable logic unit 110b. In implementing such a node of a decision tree in the apparatus 100, the apparatus 100 may determine a path through the tree, which can be compared with a threshold or other computation result of logically similar paths (e.g., computation results produced by other FPGAs 100).

FIG. 2B is a block diagram of an example FPGA 200 in accordance with an embodiment of the present disclosure. The apparatus 200 includes an interconnect 102 and DSP slices 205a-205b coupled thereto. Similarly numbered elements of FIG. 2 as compared to FIG. 1 may be implemented by, be used to implement, and/or may operate in the same way as described above with reference to FIG. 1. Accordingly, CLUs 210 may operate in an analogous manner as CLUs 110 described above. In addition, CLUs 220 may operate in an analogous manner as CLUs 110 described above. While only two DSP slices 205a, 205b are depicted in FIG. 2, it can be appreciated that apparatus 200 may include any number of DSP slices, for example, as described with reference to FIG. 3. The apparatus 200 may cascade DSP slices together such that a DSP slice may provide at least one output path as at least one input path to another DSP slice. The apparatus 200 may be implemented in various hardware platforms, including but not limited to: an ASIC, a DSP implemented in an FPGA, or a SoC.

As depicted in FIG. 2, the DSP slice 205b includes an output path ROUT that is coupled to the DSP slice 205a as input/path RIN. Such an output path ROUT may provide operands processed or received by the DSP slice 205b to the DSP slice 205a. In some embodiments, while not shown in FIG. 2, the output path ROUT and/or the input path RIN may be coupled to the interconnect 202, such that the input/outputs of some of the DSP slices may be coupled via the interconnect 202, rather than direct connections between individual DSP slices, such as depicted in the cascaded coupling of DSP slice 205a to the DSP slice 205b.

The apparatus 200 includes configurable logic units (CLUs) 210a, 210b, operation mode control 215, a switch 225, switches 217a-c, and configurable logic units 220. The switch 225 receives a control signal CTL 227 from the interconnect 202 that indicates to the switch a selection of the operand inputs. Operand inputs of the DSP slice 205a include operand A 204a, operand B 204b, operand C 204c, operand D 204d, an operand E 204e. Input paths, to the switch 225, of the apparatus 200 may include inputs for the operand A 204a and the operand C 204c.

Input paths, to the switch 217a, of the apparatus 200 may include inputs for the operand A 204a, the operand E 204e, an output of the configurable logic unit 210b, and a '0' line. The '0' line may be coupled to a ground connection, such a ground connection that is 0V. Input paths, to the switch 217b, of the apparatus 200 may include inputs for the output of the configurable logic unit 210b, the '0' line, a '1' line, and an output of the switch 225, which may provide a common operand (e.g., operand A 204a). The '1' line may be coupled to a constant voltage source, such as a voltage source of 5V or a VCC voltage source. Input paths, to the switch 217c, of the apparatus 200 may include inputs for the '1' line and the output switch 225, which may provide the common operand (e.g., operand A 204a) to the switch 217c at the same time as the switch 217b.

Accordingly, if a common operand is determined to be provided to the DSP slice 205a for an operation including a common operand, the interconnect 202 may provide the common operand as operand A 204a, which will also be provided to various configurable logic units of the DSP slice 205a. The common operand A 204a may be provided to the configurable logic unit 210a and the configurable logic units 220 via the switch 225, switch 217b, and the switch 217c. In some embodiments, the common operand A may be provided to a portion of the configurable logic units, such as the configurable logic unit 210a and one of the configurable logic units 220 via the switch 225 and switch 217b, respectively.

The configurable logic units 220 may process operands received from the switches 217a-c. The configurable logic units 220 may be configured to work in conjunction or independently. For example, one configurable logic unit of the configurable logic units 220 may be configured to carry bits, such as a carry-in unit or carry-out unit, while another one of the configurable logic units 220 may be configured to operate as a multiplier unit for a 18 bit, 27 bit, or 48 bit input path. In other embodiments, various configurable logic units 220 may be configured, in conjunction or independently, to add, subtract, multiply, divide, and/or round various operands of various bit lengths, such as 18 bit, 27 bit, or 48 bit. In some embodiments, the operation mode control 215 may specify a configuration for the configurable logic units 220. The configurable logic units 220 may output an operand P 204 *f* on an output path of DSP slice 205*a*.

The operation mode control 215 of each DSP slice may receive respective control signals indicating an operation mode for that DSP slice, such as an adder mode, a multiplier mode, an accumulator mode, a multiply-accumulate mode, a carry-in mode, a carry-out mode, or any type of arithmetic logic mode or DSP logic mode. In one implementation, the apparatus 200 may include a number of DSP slices 205*a*, 205*b* to perform machine learning application such as calculating nodes of a decision tree 50. Each of the DSP slices 205*a*, 205*b* may include a variety of input ports to receive and process operands from the interconnect 202. The apparatus 200 may provide operands on the interconnect 202 according to routing instructions stored or received by the apparatus 200.

Figure 3:
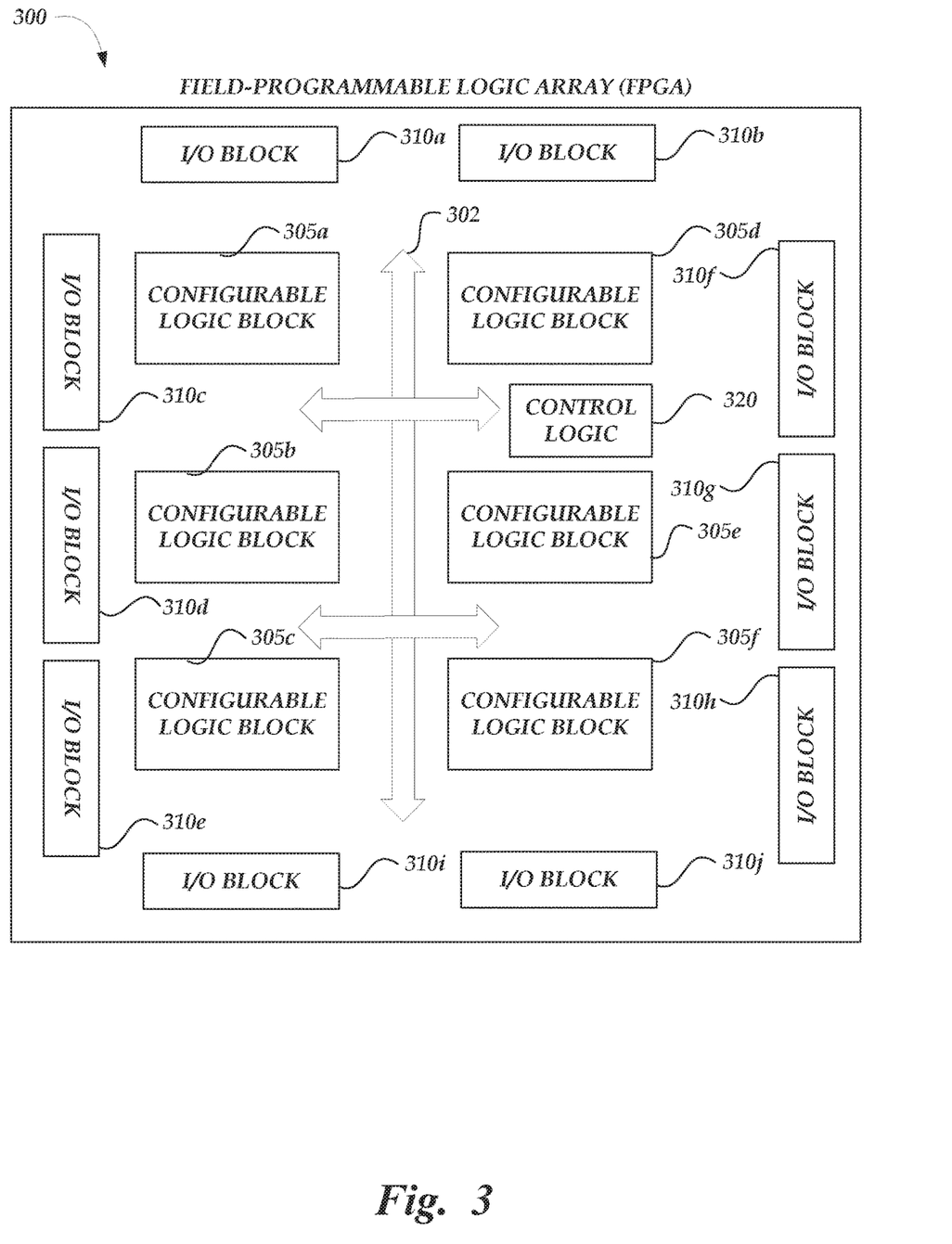

The operation mode control 215 of the DSP slice 205*a* may receive a control signal CTL 227 that indicates an operation mode for that DSP slice 205*a*, such as a first mode or a second mode. In some embodiments, the control signal CTL 227 may also be the control signal provided to the switch 225. For example, the control signal CTL 227 may be received as a control signal via the interconnect 202 from a control logic (e.g., control logic 320). The control signal may represent a determination as to whether a common operand is to be provided to the DSP slice 205*a* in a second mode. For example, the determination that the common operand is to be provided to the DSP slice 205*a* may occur during execution of an instruction set for operations to be performed by the DSP slices 205*a*.

The operation mode control 215 may be implemented using a mode register that stores a mode indicator based on a control signal indicating a mode for the DSP slice 205*a*. The mode of the DSP slice 205*a* can control the DSP slice 205*a* to activate the switch 225 as to the selection of an operand. In a first mode, the switch 225 is configured to select the operand C 204*c* for communication to the configurable logic units 220. In a second mode, the switch 225 is configured to select the operand A 204*a* for communication to the configurable logic units 220 via switch 217*b* and/or 217*c*. In some embodiments, the switch 225 is by default activated in the first mode, which provides the operand C 204*c* to the switches 217*b*, 217*c*.

With the embodiment of apparatus 200, a common operand may be provided to more than one configurable logic unit 210*a* and/or one of the configurable logic units 220. In contrast to the first mode that may utilize each input path of the DSP slice 105*a* to a configurable logic unit 210*a*, 210*b*, or 220, the DSP slice 205*a* may be fractured, in the second mode, such that at least one input path shares an operand (e.g., once shared, a common operand) with another input path of the DSP slice 205*a*. In the embodiment depicted of apparatus 200, the operand A 204*a* is provided to at least one of the configurable logic units 220 via the switch 225 when the apparatus 200 has been fractured, such that the input path to the operand register 107*b* is shared with an input path to the switch 125. In selecting a common operand during the second mode, the DSP slice 205*a* may forward the common operand to various configurable logic units of the DSP slice 205*a* for processing of that common operand. Having provided forwarded operands to additional configurable logic units of the DSP slice 205*a*, multiple computations with the same operand, now a common operand to other configurable logic units, may be computed for algorithms that may utilize a common operand, thereby advantageously improving processing speed of such algorithms in some examples.

In an example of a machine learning algorithm, a decision tree computation may be implemented in the apparatus 200; for example, such as to learn a wireless communications parameter, a data analytics parameter, a processing parameter for a hardware device unit, or a financial transaction parameter. The interconnect 202 may provide common operands to multiple FPGAs 200, such that each apparatus 200 receives a common operand that may represent a node in the implemented decision tree. For example, a common operand, operand A 204*a* may be combined with a variety of other operands in the apparatus 200. The processing results (e.g., an intermediate or final processing result) of those combinations may represent respective branches in the implemented decision tree, with the common operand A 204*a* being the common node.

In the example illustrated in FIG. 2B, the operand A 204*a* is provided to both configurable logic unit 210*a* and at least one of the configurable logic units 210*c*. In implementing such a node of a decision tree in the apparatus 200, the apparatus 200 may determine a path through the tree, which can be compared with a threshold or other computation result of logically similar paths (e.g., computation results produced by other FPGAs 200). The operand P 204*e* may represent a final processing result of the apparatus 200. In the example of FIG. 1, the final processing result may represent one of the leafs 66, 70, 74, and 78 that correspond to a likelihood of a cell phone call dropping for a cell phone connected to one of the base stations and/or devices represented by the operands C, D, E, and F, respectively.

FIG. 3 is a block diagram of an example apparatus 300 in accordance with an embodiment of the present disclosure. The apparatus 300 includes an interconnect 302, with configurable logic blocks 305*a*-305*f*, I/O blocks 310*a*-310*j*, and control logic 32 coupled thereto. While only eight configurable logic blocks 305*a*-305*f* and ten I/O blocks 310*a*-310*j* are depicted in FIG. 3, it can be appreciated that apparatus 300 may include any number of configurable logic blocks and I/O blocks 310*a*-310*j*. The apparatus 300 may cascade configurable logic blocks 305*a*-305*f* together such that a configurable logic block 305*a*-305*f* may provide at least one output path as at least one input path to another configurable logic block. The apparatus 300 may be an FPGA.

A configurable logic block 305*a*-305*f* may be implemented using be a programmable logic block, such as a computer readable medium storing instructions, or a logic circuit comprising one or more logic units, such as one or more NAND gates. The configurable logic blocks 305*a*-305*f* may be cascaded across logical rows and columns with I/O blocks 310*a*-310*j* bounding respective rows and columns for connections external to the apparatus 300. The configurable logic blocks 305*a*-305*f* may implement a DSP slice that performs DSP operations, such as DSP slice 105*a*, 105*b* or DSP slices 205*a*, 205*b*. A configurable logic block 305*a*-305*f* being implemented as a DSP slice may be referred to as a DSP unit or a DSP block of the apparatus 300. Accordingly, in some embodiments, fracturing a DSP slice, in implementing a second mode at that DSP slice, may be referred to as in-block fracturing.

Certain configurable logic blocks 305*a*-305*f* configured to operate as DSP slices may be logically analogous or similar circuits that are cascaded in the apparatus 300 to perform a single or multiple DSP operations. The DSP operations performed by the DSP slices may change individually or in combination. An operation mode control of each DSP slice may receive respective control signals indicating an operation mode for each DSP slice, such as an adder mode, a multiplier mode, an accumulator mode, a multiply accumulate mode, a carry in mode, a carry out mode, and/or any type of arithmetic logic mode or DSP logic mode.

The control logic 320 may include instructions sets (e.g., one or more program instructions or operations) to be performed by the configurable logic blocks 305a-305f. The control logic 320 may include, for example, computer software, hardware, firmware, or a combination thereof configured to provide instruction sets from a storage device to the configurable logic blocks 305a-305f. For example, the instruction sets may include instructions to perform certain logic or arithmetic operations on data, transmit data from one configurable logic block 305a-305f to another configurable logic block 305a-305f, or perform other operations. In some examples, an instruction set may be loaded onto the control logic 320 and include instructions that represent a determination as to whether a common operand is to be provided to a particular configurable logic block 305a-305f for an operation including a common operand. The control logic 320 may retrieve instructions for the configurable logic blocks 305a-305f from one or more memories, such as a volatile (e.g., dynamic random access memory (DRAM)) or non-volatile memory (e.g., Flash memory). The instruction sets may be stored in one or more data structures, such as a database. The control logic 320 may be configured to provide control signals to various circuits of the apparatus 100. For example, responsive to receiving a memory access command (e.g., read, write, program), the control logic 110 may provide control signals to control the configurable logic blocks 305a-305f to forward a common operand.

In one implementation, the apparatus 300 may include a number of configurable logic blocks 305a-305f, implemented as DSP slices, to perform machine learning application such as calculating nodes of a decision tree. Each of the DSP slices may include a variety of input ports to receive and process operands from the interconnect 102. The DSP slices may be implemented as DSP slices 105a, 105b and/or DSP slices 205a, 205b to more efficiently process an operation including a common operand. The apparatus 300 may provide operands (e.g., a common operand) on the interconnect 302 according to routing instructions stored or received by the apparatus 100.

Figure 4:
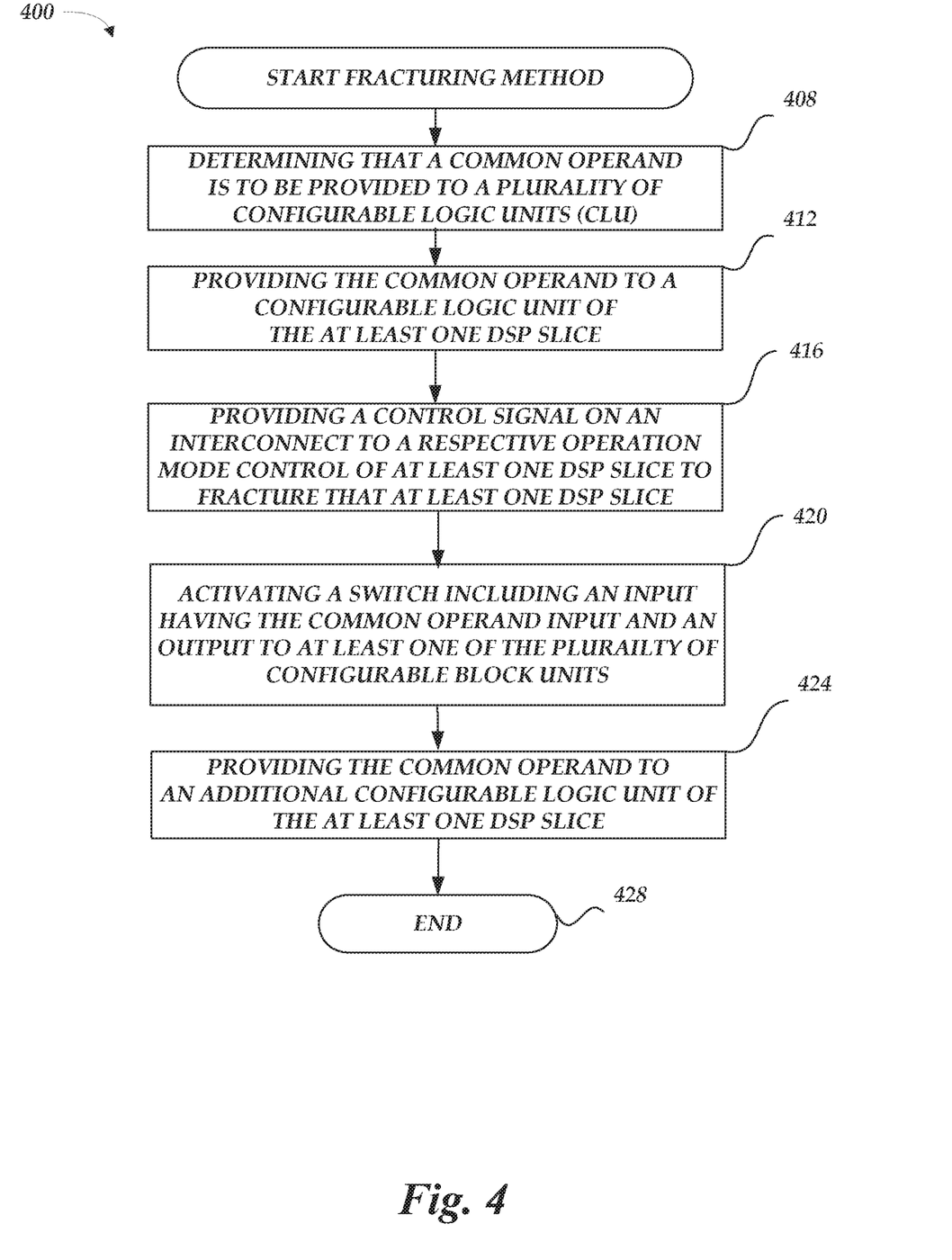
FIG. 4 is a flow diagram of an example method of fracturing according to examples of the present disclosure.

FIG. 4 is a flowchart of a method 400 in accordance with examples described herein. Example method 400 may be implemented using, for example, apparatus 100 in FIG. 1, or any system or combination of the systems depicted in FIGS. 1-3 described herein. The operations described in blocks 408-424 may be stored as control instructions in a computer-readable medium of an FPGA (e.g., the apparatus 100) or a memory accessible by the FPGA.

Example method 400 may begin the fracturing method. At block 408, the method 400 may include determining that a common operand is to be provided to a plurality of configurable logic units (CLU). An operation being performed by an FPGA, such as apparatus 100, 200, or 300 may determine that a common operand is to be provided to more than one configurable logic units (CLU) of a DSP slice. In the apparatus 200 implementation, an operation being implemented in the apparatus 200 may determine that the common operand is to be provided to at least one configurable logic unit 220. In the example, a machine learning operation may determine that a node of a decision tree is to be computed with multiple branches associated with a common operand. Accordingly, in providing the common operand to more than one configurable logic unit 220, multiple branches of a decision tree may be calculated. In such a case, a control unit of the FPGA or instructions executing control operations may determine that the common operand associated with the decision tree is to be provided to one or more configurable logic units 220 of the apparatus 200.

At block 412, the method 400 may include providing the common operand to a configurable logic unit of the at least one DSP slice. In the apparatus 200 implementation, the determined common operand (e.g., operand A 204a) may be provided to the configurable logic unit 210a. At block 416, the method 400 may include providing a control signal on an interconnect to a respective operation mode control of at least one DSP slice to fracture that at least on DSP slice. An operation mode control of a DSP slice may receive a control signal that indicates a second mode as an operation mode for that DSP slice (e.g., DSP slice 205a).

At block 420, the method 400 may include activating a switch including an input having the common operand and an output coupled to the at least one of the plurality of configurable logic units. An operation mode control of a DSP slice may provide a control signal that activates a switch to fracture the DSP slice, such that the switch selects an input having a common operand, with the switch having an output to at least one other configurable logic unit. The input having the common operand may share its input path with another input path to the configurable logic unit that had been provided the common operand at block 412 (e.g., configurable logic unit 21a).

At block 424, the method 400 may include providing the common operand to an additional configurable logic unit of the at least one DSP slice. The switch, having selected the common operand, provide the common operand to an additional configurable logic unit. In providing common operands to additional configurable logic units of the DSP slice, multiple computations with the same operand may be computed for algorithms that may utilize a common operand, thereby improving processing speed of such algorithms. Thereafter, block 424 may be followed by block 428 that ends the method 400.

The blocks included in the described example method 400 are for illustration purposes. In some examples, the blocks may be performed in a different order. In some other examples, various blocks may be eliminated. In still other cases, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 5:
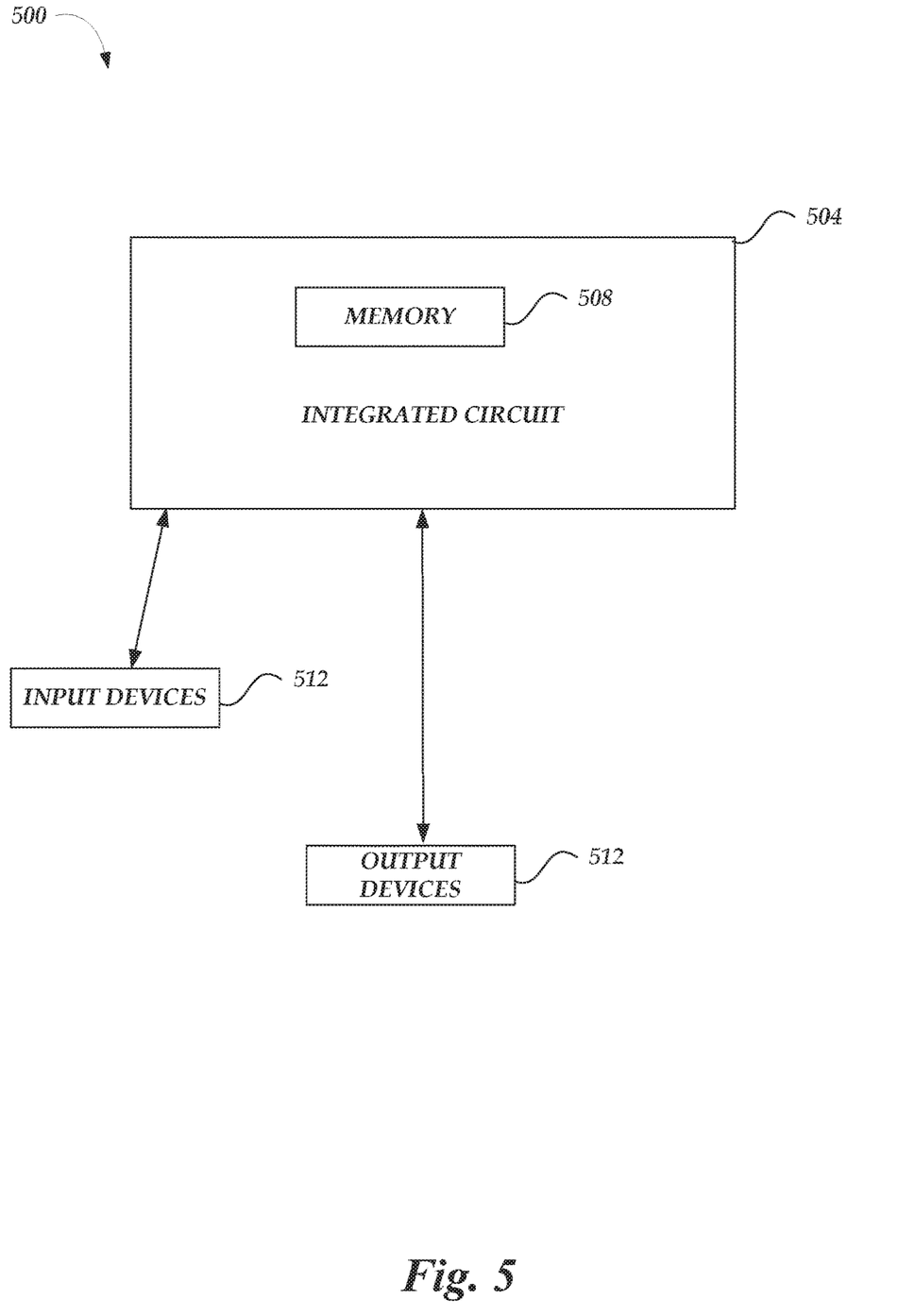
FIG. 5 is a block diagram of an example apparatus in accordance with various examples of the present disclosure.

FIG. 5 is a block diagram of a system 500 including an integrated circuit 504. The integrated circuit 504 may be implemented by any of the example apparatuses described herein, such as apparatus 100, 200, or 300. The integrated circuit 504 may include a memory 508. The integrated circuit 504 may be coupled through address, data, and control buses to the memory device 508 to provide for writing data to and reading data from the memory 508. The integrated circuit 504 includes circuitry for performing various processing functions, such as executing specific software to perform specific calculations or tasks. In performing such various processing functions, the integrated circuit 504 may utilize the methods described herein to forward to a common operand. In addition, the integrated circuit 504 includes one or more input devices 512, such as a keyboard or a mouse, coupled to the integrated circuit 504 to allow an operator to interface with the integrated circuit 504. The integrated circuit 504 also includes one or more output devices 512 coupled to the integrated circuit 504, such as output devices 512 typically including a printer and a video terminal.

Certain details are set forth above to provide a sufficient understanding of described embodiments. However, it will be clear to one skilled in the art that embodiments may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The various illustrative blocks and modules described in connection with the disclosure herein may be implemented or performed with a general-purpose processor, a digital signal DSP, an FPGA, an application-specific integrated circuit (ASIC), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Various functions described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a plurality of configurable logic blocks including a plurality of digital signal processing (DSP) slices; and
   an interconnect configured to connect the plurality of configurable logic blocks,
   wherein a first DSP slice of the plurality of DSP slices is connected to at least a second DSP slice of the plurality of DSP slices, the first DSP slice comprising:
   a plurality of configurable logic units including a first configurable logic unit and a second configurable logic unit;
   an operation mode control configured to receive a control signal indicating an operation mode of the first DSP slice;

a first operand register configured to communicate a first operand to the first configurable logic unit; and a switch configured to receive, directly from the interconnect, the first operand, wherein the switch is further configured to receive, directly from the interconnect, a second operand, wherein the switch is further configured to receive the control signal, wherein the switch is further configured to communicate the first operand or the second operand to the second configurable logic unit based on the control signal, and wherein the interconnect is configured to provide the first operand to the first operand register and the switch.

2. The apparatus of claim 1, wherein the first DSP slice is configured to receive a plurality of operands and the control signal indicative of an operand selection, the plurality of operands including the first operand and the second operand.

3. The apparatus of claim 1, the first DSP slice further comprising:
a second operand register configured to communicate a third operand to the first configurable logic unit,
wherein the first configurable logic unit is configured to receive the first operand and the third operand.

4. The apparatus of claim 3, wherein the second operand register is configured to receive the third operand from the interconnect and to receive a fourth operand from the second DSP slice.

5. The apparatus of claim 4, wherein the second operand register is configured to latch the calculated operand.

6. The apparatus of claim 1, wherein the operation mode of the first DSP slice comprises at least one of a first mode and a second mode.

7. The apparatus of claim 6, wherein, during the second mode, the switch is configured to select the first operand for communication to the second configurable logic unit.

8. The apparatus of claim 6, wherein, during the first mode, the switch is configured to select the second operand for communication to the second configurable logic unit.

9. The apparatus of claim 1, wherein the first operand, received directly from the interconnect, is provided to the first configurable logic unit from the first operand register, and wherein the first operand, received directly from the interconnect, is provided to the second configurable logic unit from the switch.

10. An apparatus, comprising:
a digital signal processing (DSP) slice that comprises a plurality of configurable logic units;
a first configurable logic unit of the plurality configured to receive a first operand directly from an interconnect and the first configurable logic unit is further configured to receive a second operand directly from the interconnect, wherein the first configurable logic unit is further configured to output a first calculated operand;
a second configurable logic unit of the plurality configured to receive a third operand and the first calculated operand, the second configurable logic unit configured to output a second calculated operand;
a first switch configured to receive the first operand directly from the interconnect and a fourth operand directly from the interconnect, the first switch configured to output a first selected operand; and
a second switch configured to receive the second calculated operand and the first selected operand, the second switch configured to output a second selected operand, wherein the second selected operand corresponds to the first operand when the first selected operand is selected as the output of the second switch.

11. The apparatus of claim 10, further comprising:
an operation mode control configured to receive a control signal indicating an operation mode of the first switch, wherein the first switch is configured to receive the control signal indicating an operand selection for the first switch.

12. The apparatus of claim 11, wherein the operation mode comprises at least one of a first mode and a second mode.

13. The apparatus of claim 12, wherein, during the second mode, the first switch is configured to select the first operand, wherein at least a third and a fourth configurable logic unit are configured to output operands based at least on the first operand received from the first switch.

14. The apparatus of claim 12, wherein, during the first mode, the first switch is configured to select the fourth operand, wherein at least a third and a fourth configurable logic unit are configured to output operands based at least on the fourth operand received from the first switch.

15. The apparatus of claim 11, further comprising:
a third switch configured to receive the first operand and the second calculated operand, and further configured to provide an output operand to at least a third configurable logic unit.

16. The apparatus of claim 11, wherein the first configurable logic unit is configured to add operands and the second configurable logic unit is configured to multiply operands.

17. The apparatus of claim 10, further comprising at least a third configurable logic unit configured to receive the first operand when the second switch has selected the first selected operand.

18. A method comprising:
providing a common operand to a first configurable logic unit of a digital processing slice (DSP) that comprises a plurality of configurable logic units;
activating a switch that comprises an input configured to receive the common operand directly from an interconnect and an output directly coupled to the first configurable logic unit; and
providing the common operand to a second configurable logic unit of the plurality.

19. The method of claim 18, wherein said providing or activating occurs responsive to a learning operation being performed to calculate a branch of a logical tree, the branch associated with the common operand.

20. The method of claim 19, further comprising:
providing, to a DSP slice that includes the first configurable logic unit and the second, a control signal that indicates a second mode, wherein the common operand is provided to the second configurable logic unit based at least in part on execution of an instruction set associated with operations to be performed on the plurality of DSP slices.

21. The method of claim 20, further comprising:
processing the common operand, at the at least one DSP slice and another DSP slice, to generate respective output operands associated with the common operand.

22. The method of claim 18, wherein at least one of the plurality of configurable logic units comprises at least one of an adder, a multiplier, a logic unit configured as a NAND gate, an accumulator, or a bit shifter, or any combination thereof.

* * * * *